United States Patent Office 3,034,567
Patented May 15, 1962

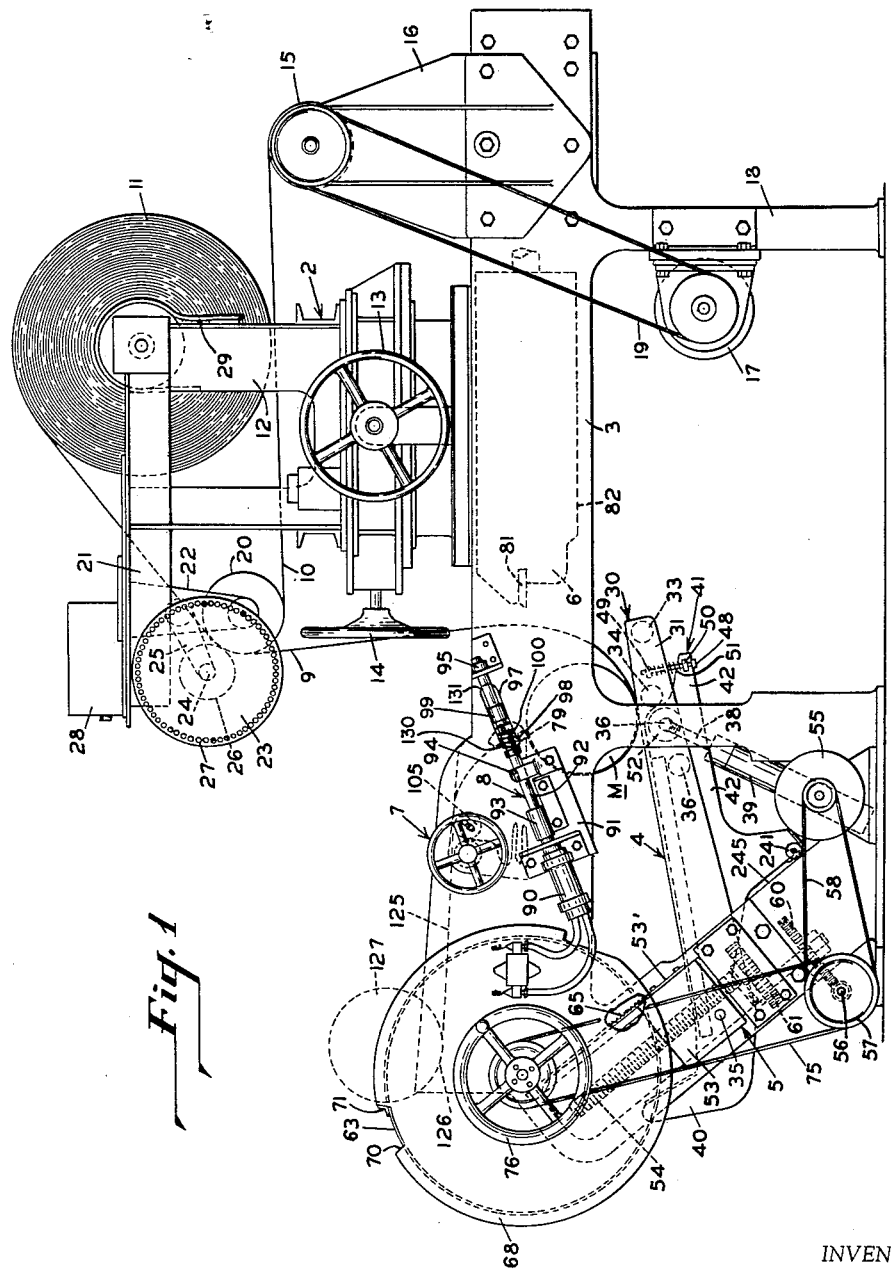

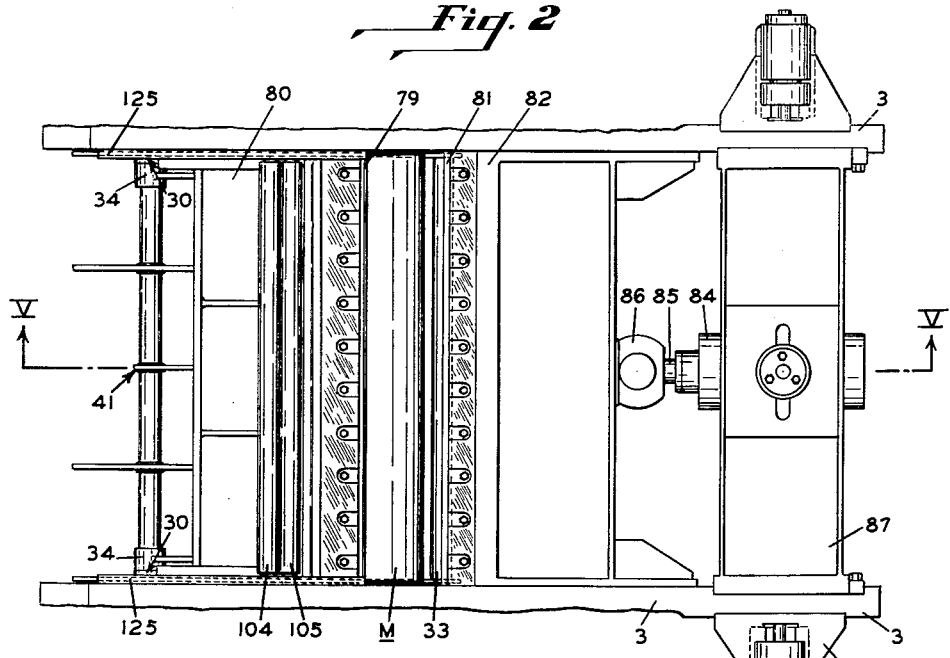
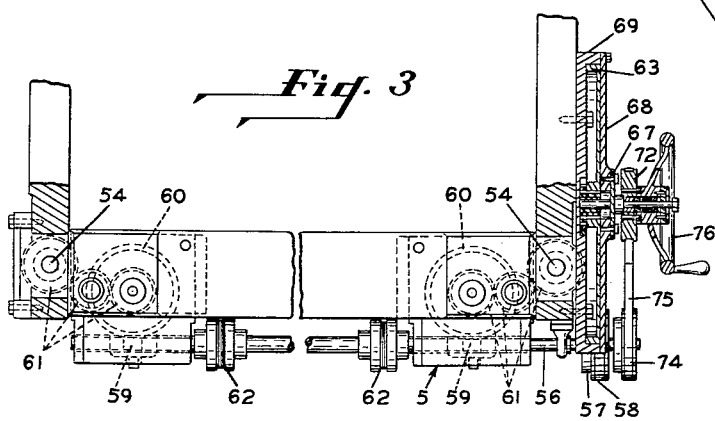
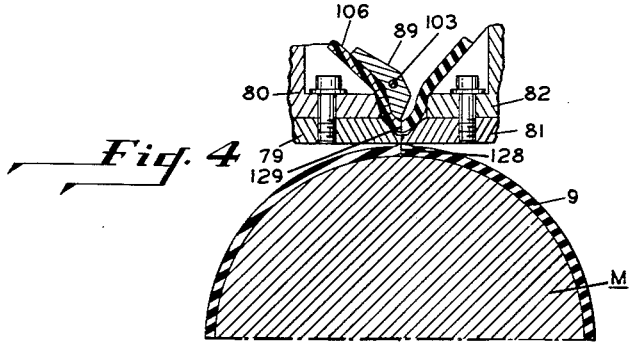
INVENTOR
RAYMOND C. MOORHEAD
ATTORNEY

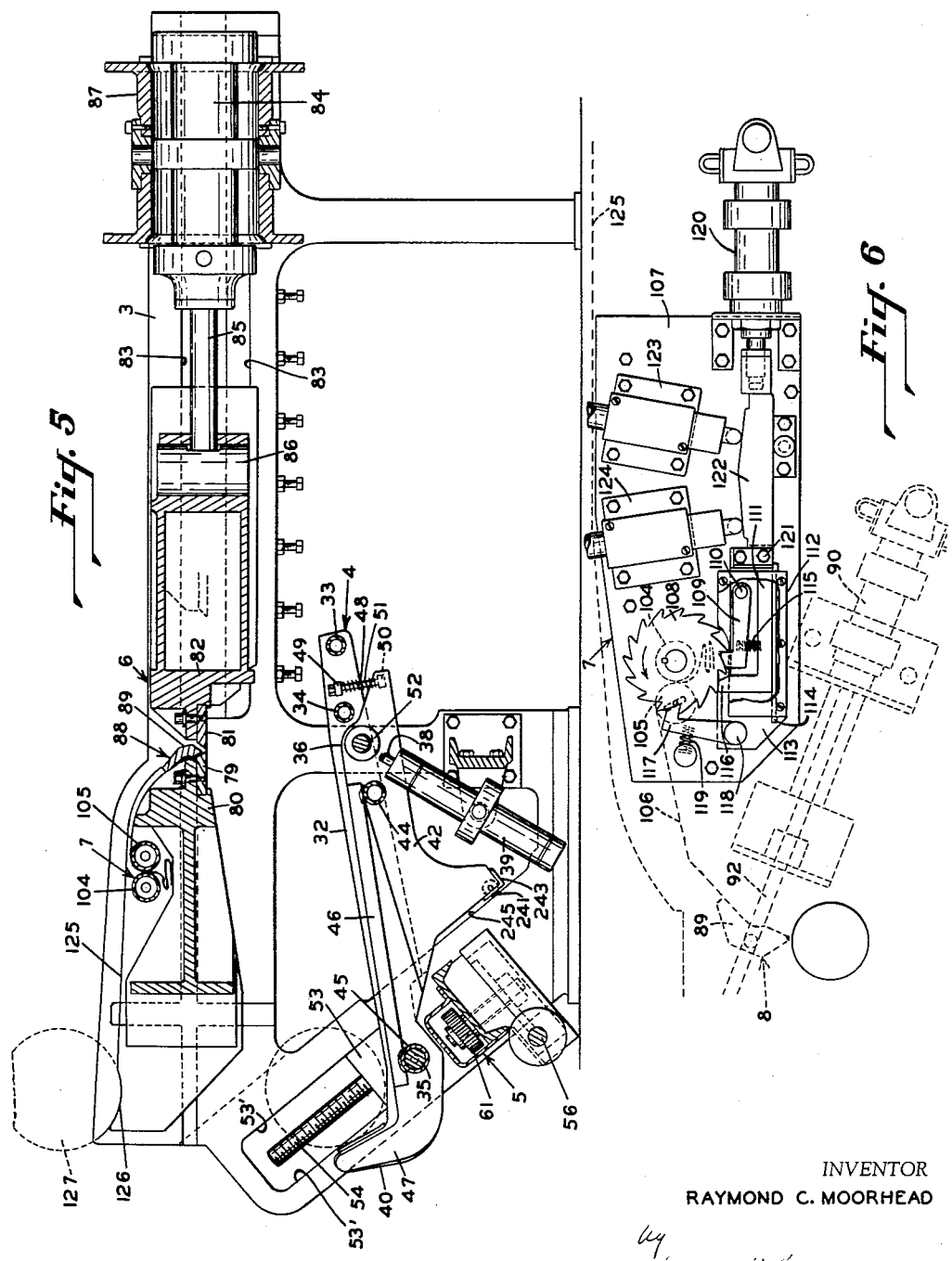

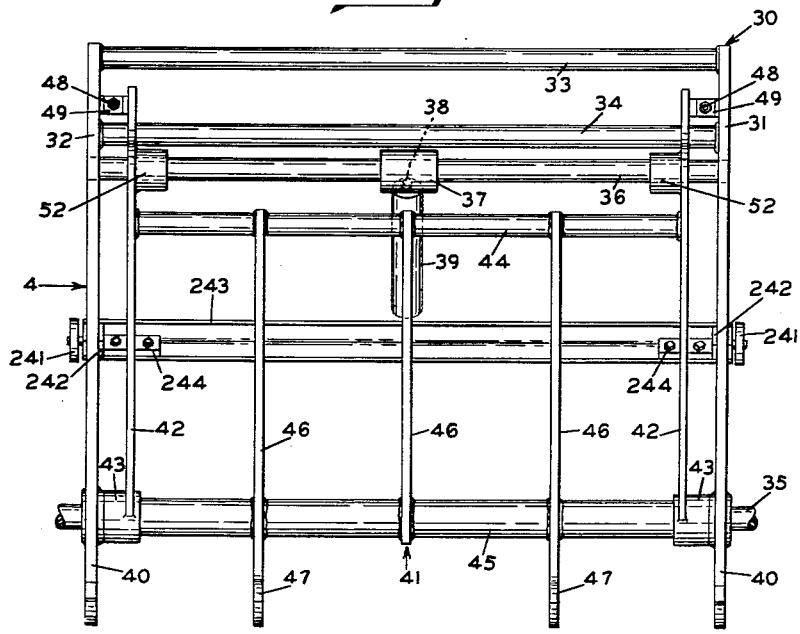
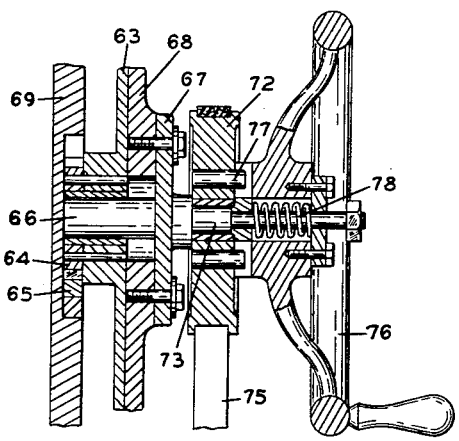
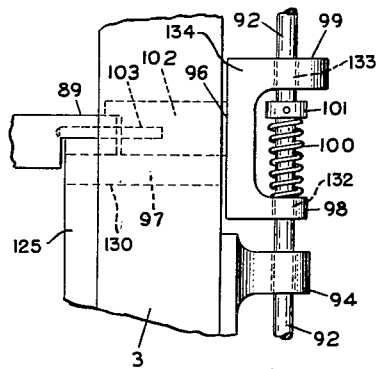

3,034,567
APPARATUS FOR FORMING A TUBE OF UNVULCANIZED RUBBER BY COLD SEAMING
Raymond C. Moorhead, Manheim Township, Lancaster County, Pa., assignor to Armstrong Cork Company, Lancaster, Pa., a corporation of Pennsylvania
Filed Feb. 12, 1959, Ser. No. 792,889
19 Claims. (Cl. 156—459)

This invention relates to a machine for forming a web of stock, such as a sheet of unvulcanized synthetic rubber, into a tube around a forming mandrel with a "welded" seam.

The machine may be used for example in the formation of tubes for use in the fabrication of textile drafting aprons. Textile drafting aprons usually include an inner layer of synthetic rubber composition, a cord reinforcing which is helically disposed over the inner layer, and a face layer of synthetic rubber, generally formed as an extruded tube, which is disposed over the inner layer and cord reinforcing. The whole unit while positioned on the mandrel is wrapped with wet fabric vulcanizing tape and the assembly is cured in a vulcanizing autoclave. The wrapping is removed, the face layer is ground to a smooth finish, and the product is removed from the mandrel, after which it is cut into aprons of desired lengths.

The formation of the inner tube on the mandrel from a web of unvulcanized rubber stock may be accomplished by wrapping a web of the stock about the mandrel and then performing a cold seaming operation. One of the problems involved in this process is to form a seam or joint which lies essentially in the wall thickness of the stock, without an objectionable protrusion above the outer periphery of the tube. This requires precise positioning of the mandrel with respect to the knives which perform the seaming operation, taking into account the thickness of the stock being formed into a tube.

Aprons are made in various sizes from about 1" to about 8" in diameter, and the machine, to be essentially universal in operation in the fabrication of the various sizes of tubes commonly encountered, must be adjustable and such adjustment should be readily effected, for changes in the size of the mandrels to be covered occur quite frequently in normal commercial production.

An object of the present invention, therefore, is to provide a tube forming machine which will be adjustable to operate upon forming mandrels of different diameters and which may be adjustable readily when a change in mandrel size is necessary.

In cold seam formation, the web of unvulcanized stock is wrapped around the mandrel with overlapping portions extending therefrom. The seaming knives are brought together in the overlapping portions and are so designed that they extrude the unvulcanized stock trapped between the approaching narrow seam forming surfaces of the knives. This serves to cold "weld" the abutting surfaces of the tube at the mandrel surface and also to weld the abutting surfaces in the overlapping portions of the stock beyond the narrow seam forming surfaces. Actually, two seams are formed, one in the material on the mandrel and another in the overlapping portions thereabove where the stock from the main supply web is "welded" to previously pinched off portions of the stock, forming what may be termed a trailer ribbon. The material in the area trapped between the narrow seam forming surfaces, i.e. between the two seams, is reduced to an extremely thin film and may even be completely severed if the seam forming surfaces are well formed.

Another object of the present invention is to provide an arrangement which utilizes the trailer ribbon formed of the short pieces pinched off above the seam forming surfaces and cold welded one to another, as a lead strip for indexing fresh stock into the zone of the seaming knives for seam formation on each cycle of operation of the machine, permitting close seaming to the trailer ribbon and avoiding waste.

An additional object of the invention is to provide an arrangement for the delivery of completed wrapped mandrels from the seaming station upon completion of the seaming operation and an arrangement for severing the thin web of stock material which may remain between the seaming knives, utilizing the weight of the mandrel and the stock on it, moving downwardly by gravity, to effect such severance.

A good, well-shaped tube with a close and well-formed seam requires that the stock be drawn snugly around the mandrel. This in turn requires that the portion of the web of stock positioned to be wrapped around the mandrel be of accurate length.

Another object of the invention is to provide a mechanism for accurately feeding the stock to the seaming unit and also for withdrawing an accurately measured amount of the trailer ribbon on each cycle of operation of the machine so that the loop or festoon of stock disposed for wrapping around the mandrel will be of precise length.

In tube formation, particularly during the wrapping of the stock around the mandrel and in the initial stage of the seam formation, it is important to hold the stock in fixed position, closely adjacent to the seam forming surface of the fixed or dead knife of the seam former. This is necessary to avoid wrinkling and distortion of the stock and provide a firm, fixed line of engagement against which the stock may be drawn as it is wrapped snugly around the mandrel.

A further object of the invention, therefore, is to provide a clamping arrangement which automatically will be brought into engagement with the stock to clamp it in fixed position prior to the seaming operation and will automatically be released upon completion of the seaming operation to permit indexing movement of the trailer ribbon prior to the next cycle of operation of the machine.

Other objects of the invention will be clear from the following description of an embodiment of the invention, which will be given in conjunction with the attached drawings.

In the drawings:

FIGURE 1 is a side view of the machine showing the general arrangement;

FIGURE 2 is a top plan view with the stock roll supporting and other units removed to show the seaming knives and the actuator for the live knife;

FIGURE 3 is a top plan view partly in section illustrating the mandrel cradle adjusting mechanism;

FIGURE 4 is a detailed diagrammatic sectional view showing the seaming operation;

FIGURE 5 is a sectional view to an enlarged scale taken along the line V—V of FIGURE 2;

FIGURE 6 is a detailed view showing the feeding device for a trailer ribbon and also showing in dotted lines a stock clamping mechanism;

FIGURE 7 is a top plan view of the mandrel supporting cradle arrangement;

FIGURE 8 is a detailed sectional view of a portion of the mandrel supporting cradle adjusting mechanism; and FIGURE 9 is a detailed top view of a part of the stock clamp actuating mechanism associated with the main frame.

*The General Arrangement*

The general arrangement is shown in FIGURE 1. It includes a stock feeding, guiding, and measuring unit 2 mounted on the main frame 3 of the machine. A mandrel supporting and positioning unit 4 which is adjustable to accommodate mandrels of various sizes and which is provided with a retracting mechanism to aid in separation of the completely formed tube from the trailer ribbon and in gravity discharge of the mandrels is positioned below the unit 2 and is pivoted to an adjusting mechanism 5. A seam forming device 6 which performs the additional function of wrapping the stock around the forming mandrel prior to seam formation is mounted between the side frame members of main frame 3 and includes a movable seam forming knife which engages the ribbon of stock as the knife travels toward a stationary seam forming knife, draws the ribbon snugly around the mandrel, forms the seam, and simultaneously "welds" the ribbon of stock above the seam onto the "trailer" ribbon. A trailer ribbon indexing mechanism 7 is mounted between the side members of frame 3 and serves periodically to extract a short portion of the trailer ribbon to provide a fresh area of stock to which to "weld" the severed end of the stock upon completion of each seaming operation of the machine. There is also provided a stock clamping unit 8 which serves to press the stock into engagement with the stationary seam forming knife during mandrel positioning and seam forming.

The Stock Feeding, Guiding and Measuring Unit

The stock generally is in the nature of an unvulcanized web of synthetic rubber composition 9 supported on a web of Holland cloth, polyethylene, or the like 10 and formed into a roll 11. The roll is supported on an adjustable roll stand 12 positioned on the main frame 3 of the machine. The roll stand 12 is adjustable transversely of the machine by actuation of a hand wheel 13. The roll stand 12 is also arranged for slight pivotal movement in a horizontal plane to adjust the parallel relationship of the web of stock 9 with the seaming knives. This is effected by actuation of a hand wheel 14. This type of roll stand adjusting mechanism is well known and detailed explanation of it is not necessary. Any suitable adjusting arrangement may be provided.

A powered feeding device is provided for delivery of the stock. In the embodiment illustrated, this includes a wind-up roll 15 mounted for rotation on frame members 16, one of which is shown in FIGURE 1. The members 16 are attached to the side frame members of main frame 3. An electric motor and gear reducer unit 17 mounted on pedestal 18 of main frame 3 drives the wind-up roll 15 through a chain or other suitable drive 19. The Holland cloth 10 is fed to and secured to the wind-up roll and as the wind-up roll is rotated, the combined web of stock and Holland cloth is withdrawn from roll 11, the web of stock falls by gravity from the Holland cloth into a dip or festoon as shown in FIGURE 1, and the Holland cloth is wound onto roll 15 for reuse.

A measured amount of stock is delivered from the roll 11 on each cycle of operation of the machine. This may be accomplished visually and manually with any of the well-known measuring instruments. In the embodiment illustrated, however, it is accomplished automatically by an electronically actuated measuring unit. The combined web of stock 9 and Holland cloth 10 is led over an idler roll 20 which is supported on the roll stand 12 by frame members 21 and brackets 22, one of each of which is shown in FIGURE 1.

A counting plate 23 is fixed on a shaft 24 which is in turn supported by arms 25 which are pivoted to brackets 22. A counting plate driving wheel 26 is keyed to the shaft 24. This may be a rubber-covered wheel which engages the web of stock 9 and is rotated as the web 9 is drawn over roll 20 by wind-up roll 15. The counting plate 23 is provided with a plurality of regularly spaced openings 27 through which a beam of light may pass to a photocell which actuates an electronic counter 28. The counter is arranged to control motor 17 to stop it after delivery of a measured length of web of stock material 9. The counter 28 is adjustable so that its control of motor 17 may be varied. The openings 27 in the counting plate 23 may be of such size and so positioned that an impulse is fed to the counter 28 for each .1" delivery of web material between roll 20 and counter plate driving wheel 26. Thus, the length of the web of stock material 9 delivered may be controlled within limits of .1". A brake 29 is provided on the roll 11 and a magnetic or other brake is provided in motor 17 to prevent overrunning.

The Mandrel Positioning Unit and Adjusting Mechanism

The mandrel positioning unit 4 serves to fix the space relationship between the seam forming device and the mandrel to which the rubber stock is to be applied and seamed. Since it is important to form a close seam and to have the rubber stock fit snugly against the mandrel surface, the mandrel positioning unit 4 must be capable of fine adjustment.

The mandrel positioning unit includes a mandrel supporting cradle 30 shown complete in FIGURE 7. It includes cradle arms 31 and 32 joined at their forward ends by cross bars or tubes 33 and 34 welded to the arms. The rearward ends of the arms 31 and 32 are pivoted to an elevator cross shaft 35, for adjustment as will be more fully described. A cradle actuator bar 36 extends between the arms 31 and 32 and carries a piston rod connector 37 to which is secured piston rod 38 (shown also in FIGURES 1 and 5) of hydraulic cylinder and piston power unit 39 which is disposed midway between the side frames of the machine and is pivoted to a cross frame member as shown in FIGURE 5. The function of the power unit 39 will be described below. The arms 31 and 32 are provided with upwardly projecting end stops 40 to arrest the movement of the completed, covered mandrels as they roll down the cradle. The stops 40 may be covered with yielding pads of leather or the like, as shown in FIGURES 1 and 5.

Also mounted on the elevator cross shaft 35 is a cradle support 41 (FIGURE 7) which includes a pair of arms 42 welded to bearings 43 and connected together by cross tubes 44 and 45 which are welded to the arms 42 and fixed to bearings 43, respectively. Three transverse mandrel supporting braces 46 are secured to the tubes 44 and 45 by welding. The two outermost braces 46 are provided with safety end stops 47 which project upwardly as shown in FIGURE 5.

The cradle 30 is connected at its forward end to the cradle support 41 by connector bolts 48 which pass through pairs of lugs 49 and 50 (FIGURES 1 and 5) welded on to the arms of the cradle and the cradle support, respectively. Compression springs 51 are disposed around the bolts 48, between the lugs 49 and 50, and serve yieldingly to hold the cradle and cradle support together for elevating movement in unison and also permit a slight yielding movement of the cradle 30 downwardly with respect to the cradle support 41 at the end of each operating cycle of the machine to facilitate rupture of the finished tube from the trailer ribbon and ejection of the completed, covered mandrel from the seaming station.

This minor downward movement of the cradle 30 relative to the cradle support 41 is effected through actuation of power unit 39 and is limited by hollow annular stops 52 (FIGURE 7) which are welded to arms 42 on the cradle support 41. The actuator bar 36 passes through openings provided in stops 52 and these openings are larger in diameter than the diameter of the actuator bar 36 by ¼", for example, as shown in FIGURE 5. This permits the actuator bar 36 to which the cradle 30 is fixed to move about ¼" with respect to cradle support 41 to which the stops 52 are fixed. This action is effected upon actuation of the piston and cylinder power unit 39, such movement compressing springs 51. The cradle 30 is returned to its normal position by action of the springs 51 upon release of air pressure on power unit 39. This slight movement is effective for breaking any thin web of rubber of the stock wrapped around the mandrel which may exist upon completion of the seaming operation. This will be discussed more fully in connection with a description of the operation of the machine.

The cradle adjusting mechanism is shown in FIGURES 1, 3, 5, and 8. The positioning of the mandrel supporting cradle 30 with respect to the seaming knife unit 6 is important if a good, tight wrap is to be formed around the mandrel and a good, close seam is to be formed without an objectionable projecting ridge. This adjustment is accomplished in the embodiment illustrated by attaching the elevator cross shaft 35 (FIGURE 5) to a pair of elevator blocks 53 which are movable in ways 53' provided in the side frame members of the machine. One of the elevator blocks is shown in FIGURE 5 and other is shown in FIGURE 1. The elevator blocks 53 are threaded and receive elevating screws 54. The screws 54 are rotated by a gearing arrangement driven by reversible electric motor 55 (FIGURE 1).

The gearing arrangement is shown in FIGURE 3 and includes a worm shaft 56 to which is keyed a pulley 57 over which is trained a belt 58 driven by motor 55 (FIGURE 1). A pair of worms 59 also are keyed to the worm shaft 56 and mesh with worm wheels 60 which in turn drive screws 54 through intermediate spur or other similar gearing indicated at 61. A pair of flexible couplings 62 may be provided on the worm shaft 56.

To provide the operator with an index of the position of the mandrel supporting cradle 30, an index wheel 63 (FIGURE 1) is provided. It has pinned to its hub a pinion 64 (FIGURE 8) which meshes with a rack 65 attached to elevating block 63 as shown in FIGURE 1. The index wheel 63 (FIGURE 8) is mounted for rotation about stud shaft 66 which has an integral attaching plate 67 secured to cover plate 68 (FIGURE 3) for housing 69 which is attached to the side frame of the machine. Thus, as elevator block 53 is moved, rack 65 turns pinion 64 and index wheel 63 is rotated. The surface of the index wheel may be provided with suitable indicia to indicate the position of the mandrel supporting cradle. Housing 69 (FIGURE 8) and housing cover 68 are provided with an opening 70 through which the index wheel 63 may be viewed by the operator. A pointer 71 may be provided on the housing to cooperate with the indicia on the index wheel to show the mandrel cradle position.

A manually operable adjusting arrangement is also provided for rotating the worm shaft 56 so that micrometer manual adjustment of the position of the mandrel supporting cradle may be made. This is shown in FIGURES 1, 3 and 8. It includes a gear faced pulley or timing gear 72 (FIGURE 8) which is freely rotatable on an extension stud shaft 73 projecting from and integral with plate 67. A similar pulley or timing gear 74 (FIGURE 3) is keyed to the worm shaft 56. A gear faced belt or timing belt 75 is trained over pulleys 72 and 74.

Pulley 72 is arranged for rotation by hand wheel 76 (FIGURE 8) which is freely rotatable on stud shaft 73 and is provided with openings in its hub which receive pins 77 pressed into the hub of pulley 72. These pins are brought within the openings in the hand wheel 76 when the hand wheel is pressed inwardly against the action of a spring 78. Thus, the operator may engage the hand wheel with the pulley 72 through the pins 77 and rotate the hand wheel, thereby turning the worm shaft 56 through belt 75 and pulley 74 attached to the worm shaft and effecting movement of the elevator blocks 53 and adjustment of the position of the mandrel supporting cradle. The hand wheel 76 normally is returned to its inactive position by spring 78 so that during power movement of the worm shaft 56 which also effects movement of the belt 75 and pulley 72, the hand wheel 76 will not be rotated, the pulley 72 merely idling on stub shaft extension 73.

The cradle support 41 is guided in its raising and lowering movements by a pair of guide wheels 241 (FIGURE 7) mounted on extension blocks 242 welded to an angle frame member 243 which is bolted to lugs 244 projecting from the cradle support arms 42. The wheels 241 ride on ways 245 (FIGURES 1 and 5) provided on the side frame members.

*The Seam Forming Mechanism and Stock Clamp*

The seam forming mechanism 6 and the stock holding clamp 8 are shown in FIGURES 1, 2, 4, 5, 6, and 9. The seam forming mechanism includes a dead knife 79 (FIGURES 4 and 5) removably clamped to a dead knife holder 80 which is firmly interlocked with the frame of the machine to take the thrust involved in the seaming operation. A movable or live knife 81 is clamped to a live knife holder 82 which is slidable in ways 83 toward and away from dead knife 79.

The live knife 81 is actuated by a hydraulic cylinder and piston power unit 84, the piston rod 85 of which is connected to the live knife holder 82 by a pivoted connection 86. The power unit 84 is pivotally secured (FIGURE 5) to a cross frame member 87 (FIGURE 2) inlet into and bolted to the side frame members of main frame 3 to take the thrust of the live knife involved in the seaming operation.

Associated with the dead knife 79 is a stock clamping arrangement 88 (FIGURE 5) which includes a clamp bar 89 which extends transversely of the machine and is arranged to engage the trailer portion of the stock disposed in engagement with the dead knife 79 and its holder 80 as shown in FIGURE 4. The clamp is equal in length to the width of the stock so as to clamp the stock throughout its width and prevent distortion during fabrication operations.

The clamp bar 89 is pivotally attached to a pair of actuators mounted on the outside of main frame 3; one is shown in FIGURE 1. This mechanism on each side of the machine includes a double acting piston and cylinder power unit 90 (FIGURE 1) mounted on a frame 91 attached to the side frame. Piston rod 92 of the power unit 90 is mounted for limited axial sliding movement in bearings 93, 94, and 95. Mounted on piston rod 92 and movable with it is a slide 96 (FIGURE 9) which is guided in way 97 extending from 130 to 131 (FIGURE 1) formed in the main frame. Slide 96 is shown to a larger scale in FIGURE 9. It includes a yoke 134 with arms 98 and 99 having openings 132 and 133 therein through which the piston rod 92 passes. A compression spring 100 encircles the piston rod 92 and is disposed between arm 98 and a collar 101 which encircles piston rod 92 and is fastened to it. The slide 96 has a rectangular boss 102 which is received in the guiding way 97. A pin 103 (FIGURE 9) is received within the boss 102 and in the end of the clamp bar 89. This permits limited pivotal movement of the clamp bar 89 to accommodate its clamping surface to the surface of the trailer stock. A similar clamp actuating mechanism including a similar double acting air cylinder and piston power unit and similar guiding mechanism is provided on the opposite end of the clamp bar 89. Thus, when the two power units 90 are actuated to draw their piston rods 92 inwardly, slides 96 are moved to bring clamp bar 89 into clamping position, such action being cushioned by spring 100. When power units 90 are energized to extend their piston rods, slides 96 are moved in an opposite direction and the clamp bar 89 is removed from its clamping position

*The Trailer Ribbon Extracting Mechanism*

This mechanism is shown in FIGURE 6. It includes a driven roll 104 which is mounted for rotation in bearings in the side frame members of the machine and a cooperating idler pinch roll 105 which is mounted for movement toward and away from roll 104 in slotted bearings and is driven by engagement with the trailer stock 106 and driven roll 104. Mechanism is provided for imparting a slight rotary or indexing motion to roll 104 on each cycle of operation of the machine to bring a fresh section of stock into position over the dead knife 79 of the seam forming mechanism for formation of a new seam on the stock applied to the next mandrel to be covered. This indexing mechanism is carried on a mounting plate 107 which is bolted to the side frame of the machine opposite to the side shown in FIGURE 1.

The actuator for indexing the roll 104 includes a ratchet wheel 108 keyed to the shaft of roll 104. A pawl 109 is pivoted at 110 to a slide plate 111 which is reciprocable between plates 112 and 113 on a guide 114. The pawl 109 is urged upwardly into engagement with the teeth on ratchet wheel 108 by a spring 115. Slide plate 111 is provided with a stop 116 to prevent overtravel of the ratchet wheel 108. An escapement dog 117 is pivoted at 118 to plate 113 and is urged into tooth engaging position by spring 119. This dog 117 engages the ratchet teeth to prevent reverse rotation of the ratchet wheel 108 upon movement of pawl 109 over the ratchet teeth.

The slide plate 111 is actuated by a double acting air cylinder and piston power unit 120, the piston of which is connected to the slide plate 111 by bolts 121. A cam plate 122 is mounted on the connection between the power unit 120 and the slide plate 111 for actuation of a pair of switches 123 and 124 which control the actuation of power unit 120 and power unit 90.

The slide plate 111 is shown in its fully advanced position in FIGURE 6. Upon application of air pressure to power unit 120 to extend its piston rod to which the slide plate 111 is affixed, the slide plate 111 moves to the left as viewed in FIGURE 6. Pawl 109 is depressed against spring 115 as the pawl slides along the tooth of ratchet wheel 108 with which it is engaged. The ratchet is prevented from rotating in a counterclockwise direction during this motion by engagement of escapement dog 117 with a tooth on ratchet wheel 108. Stop 116 is moved to a position away from the tooth of ratchet wheel 108 with which it is engaged.

When movement of slide plate 111 has been effected sufficiently to permit pawl 109 to fall behind the next tooth of the ratchet wheel 108, air under pressure is applied to the opposite side of the piston in power unit 120 to return the same to the position shown in FIGURE 6. This results in pawl 109 engaging a tooth on the ratchet wheel 108 and rotating the ratchet wheel a small portion of a revolution. During this movement of ratchet wheel, escapement dog 117 is moved about its pivot 118 against the action of spring 119. When the slide plate 111 is returned to its normal or at-rest position as shown in FIGURE 6, the escapement dog 117 will have passed over one tooth and will have been urged into a position therebehind by spring 119. Also, stop 116 will have been brought to a position below a tooth on the ratchet wheel to prevent rotation of the ratchet wheel in a direction to advance the trailer ribbon. Thus, a precise movement of the trailer ribbon is effected. A movement of the trailer ribbon of about ⅜" on each cycle of operation is adequate to present fresh stock to the seaming knives. In other words, the "weld" between the trailer ribbon and the fresh stock is moved about ⅜" away from the dead knife on each cycle of operation of the machine.

The Mandrel Guide

Mandrel guiding shoes 125 (FIGURES 1, 2, 5, 6 and 9) are provided on the inside of the side frames of the machine. They may be provided with detents 126 (FIGURE 5) to hold a mandrel 127 in position ready for use. The operator moves a mandrel down the guiding shoes and positions it on the mandrel supporting cradle on each cycle of operation of the machine. Proximity switches and other safety devices are provided to prevent accidental movement of the live seaming knife 81 during mandrel positioning, but they have not been shown in the drawing since they form no part of the invention. During the operating cycle of the machine, the operator positions a new mandrel in the detents 126 ready for positioning on the next cycle of the machine.

Operation of the Machine

In setting up the machine for operation, the roll of stock 11 will be positioned and threaded through the measuring unit, between roll 20 and counting plate driving wheel 26. The Holland cloth 10 will be attached to wind-up roll 15. The unvulcanized rubber stock 9 will be threaded under clamp bar 89 (FIGURE 6) and between rolls 104 and 105 of the trailer ribbon indexing mechanism. The roll stand 12 (FIGURE 1) will be adjusted for proper positioning of the web by actuation of hand wheels 13 and 14.

Motor 55 will be energized to elevate or lower cradle 30 and final adjustment will be made by the operator by rotation of hand wheel 76, the operator observing the index on wheel 63 and index pointer 71.

Electronic counter 28 will be set for the desired length of stock and motor 17 will be energized to deliver a festoon of stock 9 of a desired length, controlled by counting plate 23. The operator will position the mandrel M to be covered within the festoon and on the arms 31 and 32 (FIGURE 7) of the cradle. Air under pressure will be supplied to the power units 90 (FIGURES 1 and 6) for the clamping mechanism and the clamp 89 will be brought into clamping position.

Hydraulic pressure then will be applied to move the live seaming knife 81 toward the dead seaming knife 79 (FIGURE 2). During its movement, the live seaming knife 81 engages the stock 9 in the festoon as shown in FIGURE 1 and wraps it snugly around the mandrel M. As the closing movement continues (FIGURE 4), the overlapping portions of the stock disposed between the seaming surfaces of the knives 79 and 81 is extruded upwardly and downwardly and a close seam 128 is formed where the edges of the stock 9 wrapped around the mandrel M abut. This extrusion action also forms a seam 129 where the web of stock 9 meets and is joined to the trailer ribbon 106 which as shown in FIGURE 4 is made up of short ⅜" long sections of stock joined or seamed together. Of course, when the machine is first started up, the trailer ribbon is made up of fresh stock. The seams 129 have been indicated by vertical lines through the trailer ribbon 106 in FIGURE 4. If the seaming surfaces on the knives 79 and 81 are well formed and adequate pressure is applied to the stock disposed between them in the forming operation, the stock will be severed. A thin web of material frequently is left between the knives, however, and this is readily severed.

This severance is accomplished by retracting the cradle 30 (FIGURE 1) so that the weight of the mandrel M and its tube of stock formed therearound is carried by the thin web which breaks away. The cradle 30 is retracted by actuation of air power unit 39, the piston rod 38 of which is attached to cradle actuator bar 36 (FIGURE 7). The actuator bar is movable to a limited extent within the confines of stops 52 (FIGURE 5).

As soon as the cradle has been lowered and the web broken, the mandrel with its tube formed thereon rolls by gravity down the cradle 30 and cradle support 41 until it engages the stops 40, where it is positioned for convenient grasp by the workman for removal from the machine.

Upon completion of the foregoing operations, the trailer ribbon indexing mechanism is actuated to bring a fresh portion of stock into position for seaming upon the next cycle of operation of the machine.

Air power unit 120 (FIGURE 6) is energized to move its piston rod to an extended position. This brings pawl 109 into position to engage an advance tooth on ratchet wheel 108. The power unit 120 is then energized to move the piston rod to a retracted position. This causes ratchet wheel 108 to be rotated a portion of a revolution and roll 104 to be rotated, advancing the trailer ribbon 106 a short distance, ⅜" for example.

It is obvious, of course, that the various mechanisms for effecting stock delivery, trailer ribbon indexing, stock clamping, and mandrel cradle lowering may be interconnected electrically or mechanically or through their various fluid pressure systems to be essentially automatic in operation and that suitable controls may be provided so that the operator may intervene in any operation to make adjustments.

For example, the control for the trailer ribbon indexing mechanism may be interrelated with the stock clamping mechanism as shown in FIGURE 6 and also with the stock delivery mechanism 2. This is accomplished by arranging for power unit 90 and power unit 120 to be energized simultaneously, with unit 90 moving at a faster speed than unit 120. At the same time as power units 90 and 120 are energized, motor 17 for the stock feed device is energized. As unit 90 moves on its outstroke, clamp bar 89 is released from the trailer ribbon 106 and at the same time, slide 111 of the trailer ribbon indexing mechanism has moved to engage an advance tooth on ratchet wheel 108. Cam 122 which is attached to power unit 120 energizes switch 124 and this effects reversal of power unit 120. Slide 111 on the return stroke indexes ratchet 108 by the distance of one tooth, withdrawing the trailer ribbon by the action of rolls 104 and 105.

As power unit 120 approaches the end of its inward stroke, switch 123 is energized by the action of cam 122. This effects reversal of power unit 90, bringing clamp bar 89 into clamping position against the trailer ribbon. During this movement of power unit 120, the actuator plunger on switch 124 is moving along the surface of cam 122 and is reset for the next cycle of operation of the machine.

The stock feeding motor 17 continues to operate until a measured amount of stock has been delivered into the festoon, measured by the electronic measuring unit 23—28 (FIGURE 1) whereupon motor 17 is de-energized.

The operator then inserts a mandrel and actuates a control for hydraulic power unit 84 which moves the live seaming knife 81 toward dead knife 79 to affect the seaming operation. A suitable interlock may be provided to actuate power unit 39 upon completion of the seaming operation and while the seaming knives are in closed position. This will release the completed, covered mandrel for discharge down the mandrel cradle. A suitable control for power unit 84 may be provided to part the seaming knives upon completion of the power stroke of unit 39.

The machine is now ready for a new cycle of operation. When the operator presses the starting button (not shown), switch 123, which controls the reversing of the air supply to power unit 90, automatically is reset and ready for its new cycle of operation.

From the foregoing, it will be clear that all of the objects of the invention are met in the embodiment of the invention illustrated in the drawings. While that embodiment is designed especially for operation on mandrels about 38″ long and varying from about 1″ to 8″ in diameter, it will be clear that the general principles of the machine will be applicable to other similar tube forming operations.

I claim:

1. In a device for wrapping a ribbon of unvulcanized rubber stock about a mandrel to form a tube having a seamed joint and forming a seamed joint, the combination of a pair of relatively movable seaming knives, means for delivering a metered ribbon of stock as a festoon between said knives in open position, a cradle for supporting a mandrel disposed within said festoon of stock, a cradle support to which said cradle is attached for limited pivotal movement with respect thereto, means for relatively moving said seaming knives to seam forming position to wrap said festoon of stock about said mandrel and form a tube having a seam therein, and means for imparting a limited pivotal movement of said cradle with respect to said cradle support with said seaming knives in said seam forming position to rupture said formed tube from said ribbon of stock.

2. In a device for wrapping a ribbon of unvulcanized rubber stock about a mandrel and forming a seamed joint, the combination of a fixed seaming knife, a movable seaming knife for cooperation with said fixed seaming knife to form a seam, means for delivering a metered ribbon of stock as a festoon between said knives in open position, a cradle for supporting a mandrel disposed within said festoon of stock in a position relative to said seam forming knives, means for relatively moving said knives to bring them together to wrap said stock from said festoon about said mandrel and form a seam therein, and means for moving said cradle downwardly with respect to said knives upon completion of seam formation.

3. In a device for wrapping a ribbon of unvulcanized rubber stock about a mandrel and forming a seamed joint, the combination of a pair of relatively movable seaming knives, means for delivering a ribbon of stock as a festoon between said knives in open position, means for clamping said stock in fixed position with respect to one of said knives, a cradle for supporting a mandrel disposed within said festoon of stock, and means for relatively moving said knives to bring them together to draw the unclamped portion of stock in said festoon around said mandrel and form a seamed joint therein.

4. In a device for wrapping a ribbon of unvulcanized rubber stock about a mandrel and forming a seamed joint, the combination of a cradle for supporting the mandrel to be covered, a pair of relatively movable seaming knives for engagement with a ribbon of stock disposed about the mandrel with overlapping portions extending therefrom, said cradle having a downwardly inclined surface, means for relatively moving said seaming knives to bring said knives together and form a seamed joint in the overlapping portions at the surface of the mandrel, and means for depressing said cradle upon formation of said seamed joint in the stock on the mandrel to sever said stock at said seamed joint.

5. In a device for wrapping a ribbon of unvulcanized rubber stock about a mandrel and forming a seamed joint, the combination of a cradle for supporting the mandrel to be covered, a pair of relatively movable seaming knives for engagement with a ribbon of stock disposed about the mandrel with overlapping portions including a portion made up of fresh stock joined to a trailer ribbon extending therefrom, cooperating seam forming surfaces on said knives for engagement with said stock at said overlapping portions along a narrow band substantially parallel with the axis of the mandrel and substantially tangential to the outer surface of the layer of stock wrapped about the mandrel, and means for relatively moving said seaming knives to bring said cooperating seam forming surfaces toward one another with the overlapping portions of stock therebetween to consolidate said stock and form a cold welded joint of the stock on the mandrel and a cold welded seam connecting the stock to the trailer ribbon.

6. In a device for wrapping a ribbon of unvulcanized rubber stock at about a mandrel and forming a seamed joint, the combination of a cradle for supporting the mandrel to be covered, a pair of relatively movable seaming knives for engagement with a ribbon of stock disposed about the mandrel with overlapping portions including a portion made up of fresh stock joined to a trailer ribbon extending therefrom, cooperating seam forming surfaces on said knives for engagement with said stock at said overlapping portions along a narrow band substantially parallel with the axis of the mandrel and substantially tangential to the outer surface of the layer of stock wrapped about the mandrel, and means for relatively moving said seaming knives to bring said cooperating seam forming surfaces into seam forming relationship to extrude said stock in the overlapping portions at the surface of the mandrel into a pair of seams, one disposed on each side of said seam forming surfaces, and to reduce the thickness of the material disposed between said seam forming surfaces to a readily severable thickness.

7. In a device for wrapping a ribbon of unvulcanized rubber about a mandrel and forming a seamed joint therein in which the mandrel is positioned in fixed relationship to seam forming knives during seam formation, the combination of a mandrel supporting mechanism including a cradle support, means for adjusting the position of said cradle support with respect to said seam forming knives, a mandrel supporting cradle, means for securing said cradle to said cradle support for limited pivotal movement, and yielding means disposed between said cradle and said cradle support for yieldingly urging said cradle to a fixed position with respect to said cradle support.

8. In a device for wrapping a ribbon of unvulcanized rubber stock about a mandrel and forming a seamed joint therein in which the mandrel is positioned in fixed relationship to seam forming knives during seam formation, the combination of a pair of spaced elevator blocks, means for raising and lowering said elevator blocks, an elevator cross shaft disposed between said blocks and connected thereto for movement therewith, a mandrel supporting cradle pivoted to said elevator cross shaft, a cradle support carried by said elevator blocks for movement therewith to an adjusted position with respect to said seam forming knives, and means yieldingly securing said cradle and cradle support for adjusting movement in unison and for yielding pivotal movement of said cradle with respect to said cradle support about said elevator cross shaft to which it is pivoted.

9. In a device for wrapping a ribbon of unvulcanized rubber stock about a mandrel and forming a seamed joint therein, the combination of a fixed seaming knife, a movable seaming knife, means for delivering a ribbon of stock as a festoon between said knives when in parted position, an adjustable mandrel support positioned below said seaming knives for the reception of a mandrel disposed within said festoon of stock and in fixed position with its axis disposed substantially parallel to the length of said seaming knives and with its periphery spaced from said knives by a distance substantially equal to the thickness of the stock, clamping means for holding said stock in fixed position with respect to said fixed seaming knife, and means for moving said movable seaming knife toward said fixed seaming knife to cause said movable seaming knife to engage said stock in said festoon and draw it snugly around said mandrel and to bring the same into engagement with the fixed portion of stock adjacent to said clamping means and then to extrude material from said stock in the path of said seaming knives into the joint thereabove and therebelow to form two seams simultaneously.

10. In a device for wrapping a ribbon of unvulcanized rubber stock about a mandrel and forming a seamed joint with a pair of seaming knives, the combination of a clamping bar for engagement with said ribbon of said stock to hold it in fixed position with respect to one of said seaming knives, a pair of spaced clamp slides movable in ways, means for pivoting said clamping bar to said slides for limited pivotal movement with respect thereto, and means for moving said slides to bring said clamping bar into clamping position.

11. In a device for wrapping a ribbon of unvulcanized rubber stock about a mandrel and forming a seamed joint with a pair of seaming knives, the combination of a clamping bar for engagement with said ribbon of said stock to hold it in fixed position with respect to one of said seaming knives, a pair of spaced clamp slides movable in ways, means for pivoting said clamping bar to said slides for limited pivotal movement with respect thereto, means for moving said slides in unison to bring said clamping bar into clamping position, and yielding means disposed between said slides and said slide moving means to cushion the clamping action.

12. In a device for wrapping a ribbon of unvulcanized rubber stock about a mandrel and forming a seamed joint with a pair of seaming knives, the combination of a clamping bar for engagement with said ribbon of said stock to hold it in fixed position with respect to one of said seaming knives, a pair of spaced clamp slides movable in ways, a fluid pressure actuated cylinder and piston power unit, means for guiding the piston rod of said power unit, said slides including a yoke having a pair of spaced arms through which said piston rod freely passes, a collar affixed to said piston rod between said spaced arms, and yielding means encircling said piston rod and disposed between said collar and one of said arms to deliver driving force from said power unit to said slide therethrough.

13. In a device for wrapping a ribbon of unvulcanized rubber stock about a mandrel and forming a double seamed joint with a pair of seaming knives, one of said joints being formed between said ribbon of stock and a trailer ribbon, the combination of seam forming means and means for retracting the trailer ribbon to move said seamed joint formed therein by said seam forming means out of the operating zone of said seam forming means upon completion of the seaming operation.

14. In a device for wrapping a ribbon of unvulcanized rubber stock about a mandrel and forming a double seamed joint with a pair of seaming knives, one of said joints being formed between a ribbon of stock and a trailer ribbon, the combination of seam forming means, a pair of cooperating delivery rolls between which said trailer ribbon is disposed for movement in unison therewith, and means for rotating one of said rolls to move said seamed joint formed therein by said seam forming means out of the operating zone of said seam forming means upon completion of the seaming operation.

15. In a device for wrapping a ribbons of unvulcanized rubber stock about a mandrel and forming a double seamed joint with a pair of seaming knives, one of said joints being formed between a ribbon of stock and a trailer ribbon, the combination of seam forming means, a pair of cooperating delivery rolls between which said trailer ribbon is disposed for movement in unison therewith, a ratchet wheel attached to one of said rolls, a ratchet pawl carried by a fluid pressure actuated cylinder and piston power unit, and means for actuating said power unit to bring said pawl and ratchet mechanism into operation to rotate said one of said rolls to move the seam joint forming the trailer ribbon by said seam forming means out of the operating zone of said seam forming means upon completion of the seaming operation.

16. In a device for wrapping a ribbon of unvulcanized rubber stock about a mandrel and forming a double seamed joint with a pair of seaming knives, one of said joints being formed between a ribbon of stock and a trailer ribbon, the combination of a stock clamp for holding said stock in fixed position relative to one of said seaming knives during seam formation, means for actuating said clamp to release the same upon completion of seam formation, means for retracting the trailer ribbon to move said seam joint formed therein by said seaming knives out of the operating zone of said seaming knives upon release of said clamping means, and means controlled by movement of said trailer ribbon retracting means to move said clamp to clamping position upon retraction of said trailer ribbon.

17. In a device for wrapping a ribbon of unvulcanized rubber stock about a mandrel and forming a double seamed joint with a pair of seaming knives, one of said joints being formed between a ribbon of stock and a trailer ribbon, the combination of a pair of seaming knives, one movable relative to the other, a stock clamp engageable with the trailer ribbon to hold it in fixed position with respect to one of said seaming knives, a fluid pressure actuated cylinder and piston power unit for actuating said clamp to bring it into and out of clamping position upon each reciprocatory movement of its said piston, means for retracting the trailer ribbon to move said seamed joint formed therein by said seaming knives out of the operating zone of said seaming knives upon release of said stock clamp, a fluid pressure actuated cylinder and piston power unit for actuating said retracting means upon each reciprocatory movement of its said piston, and means carried by said last named piston for controlling the reciprocatory movement of both of said pistons of said power units to effect clamping of said stock upon completion of trailer ribbon retraction.

18. In a tube forming device including a pair of seaming knives engageable with a ribbon of unvulcanized rubber stock disposed about a mandrel to draw the same into snug position against the mandrel and form it into a tube and when in closed position to form a seamed joint in the tube on the mandrel, means for severing the ribbon at the seaming knives after completion of the tube forming operation comprising means for lowering said mandrel support with the covered mandrel thereon after closing of said seaming knives and while said knives remain in closed position to rupture said formed tube from the ribbon of stock.

19. In a tube forming device including a pair of seaming knives, one of which is fixed and one of which is movable toward and away from the fixed one, means for feeding a measured ribbon of unvulcanized rubber stock into a festoon between said knives, means for supporting a mandrel within said festoon in fixed position with respect to said fixed seaming knife, clamping means for holding said ribbon of stock fixed with respect to said fixed seaming knife, means for moving said movable seaming knife with respect to said fixed seaming knife to draw said ribbon snugly around said mandrel and form a seamed tube thereon and a second seamed joint above the seaming knives, means for lowering said mandrel support while said seaming knives are in engagement with said stock to rupture the formed tube from the ribbon of stock without affecting the second seamed joint, means for releasing said clamping means, and means for retracting said second seamed joint out of the operating zone of said seaming knives.

References Cited in the file of this patent

UNITED STATES PATENTS

| | | |
|---|---|---|
| 652,975 | Newbury | July 3, 1900 |
| 1,340,884 | Freeman | May 25, 1920 |
| 2,253,069 | Eckel et al. | Aug. 19, 1941 |
| 2,365,477 | Krueger | Dec. 19, 1944 |
| 2,557,932 | Baymiller | June 26, 1951 |
| 2,619,444 | Grantham | Nov. 25, 1952 |
| 2,732,882 | Kuts | Jan. 31, 1956 |

UNITED STATES PATENT OFFICE
CERTIFICATE OF CORRECTION

Patent No. 3,034,567                                                                      May 15, 1962

Raymond C. Moorhead

It is hereby certified that error appears in the above numbered patent requiring correction and that the said Letters Patent should read as corrected below.

Column 1, line 48, for "adjustable" read -- adjusted --; column 5, line 31, for "63" read -- 53 --; column 6, line 62, for "spring" read -- springs --; column 8, lines 22, 32, 38 and 51, for "M", each occurrence, read -- M --; column 10, line 62, strike out "at"; column 11, line 7, after "rubber" insert -- stock --; column 12, line 38, for "ribbons" read -- ribbon --.

Signed and sealed this 28th day of August 1962.

(SEAL)
Attest:

ESTON G. JOHNSON

Attesting Officer

DAVID L. LADD

Commissioner of Patents